United States Patent
Sato et al.

(10) Patent No.: US 10,234,157 B2
(45) Date of Patent: Mar. 19, 2019

(54) MANAGEMENT SYSTEM AND MANAGEMENT METHOD

(71) Applicant: Mitsubishi Electric Corporation, Tokyo (JP)

(72) Inventors: Fuyuki Sato, Tokyo (JP); Kenjiro Miura, Tokyo (JP); Masahito Matsushita, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 105 days.

(21) Appl. No.: 15/320,270

(22) PCT Filed: Aug. 6, 2014

(86) PCT No.: PCT/JP2014/004101
§ 371 (c)(1),
(2) Date: Dec. 19, 2016

(87) PCT Pub. No.: WO2016/020953
PCT Pub. Date: Feb. 11, 2016

(65) Prior Publication Data
US 2017/0198932 A1   Jul. 13, 2017

(51) Int. Cl.
*F24F 11/00* (2018.01)
*F24F 11/30* (2018.01)
(Continued)

(52) U.S. Cl.
CPC .............. *F24F 11/30* (2018.01); *F24F 11/62* (2018.01); *F24F 11/89* (2018.01); *G05B 15/02* (2013.01);
(Continued)

(58) Field of Classification Search
CPC .......... F24F 11/30; F24F 11/62; F24F 11/006; F24F 2130/10; F24F 2140/50;
(Continued)

(56) References Cited

U.S. PATENT DOCUMENTS

| | | | | |
|---|---|---|---|---|
| 2010/0292856 A1* | 11/2010 | Fujita | .................... | G06Q 10/04 700/291 |
| 2011/0035075 A1* | 2/2011 | Tomita | .................... | F24F 11/62 700/295 |
| 2012/0083927 A1* | 4/2012 | Nakamura | ........... | G05B 13/026 700/278 |

FOREIGN PATENT DOCUMENTS

| | | |
|---|---|---|
| JP | 2006-29607 A | 2/2006 |
| JP | 2006-29693 A | 2/2006 |

(Continued)

*Primary Examiner* — Kenneth M Lo
*Assistant Examiner* — David J Wynne
(74) *Attorney, Agent, or Firm* — Birch, Stewart, Kolasch & Birch, LLP

(57) ABSTRACT

A management system and a management method according to the invention calculate, on the basis of collected weather information, an operation record of a device, a state value and an acceptable range set for an area where the device is installed, and power-suppression-time during which electric power is suppressed, change-time during which the state value of the area is changed in response to the power-suppression-time by operations of the device, generate, using the calculated change-time, a control-schedule for controlling the device, and control the device. This enables reduction of electric power usage with the state value set for the area where the device is installed kept within the range in accordance with the power-suppression-time.

9 Claims, 14 Drawing Sheets

(51) Int. Cl.
*F24F 11/89* (2018.01)
*F24F 11/62* (2018.01)
*G05B 15/02* (2006.01)
*H02J 13/00* (2006.01)
*H02J 3/00* (2006.01)
*H02J 3/14* (2006.01)
*F24F 140/50* (2018.01)
*F24F 11/47* (2018.01)
*F24F 130/00* (2018.01)
*F24F 130/10* (2018.01)
*F24F 11/46* (2018.01)
*F24F 11/61* (2018.01)

(52) U.S. Cl.
CPC .................................. *H02J 3/00* (2013.01); *H02J 3/14* (2013.01); *H02J 13/0062* (2013.01); *F24F 11/46* (2018.01); *F24F 11/47* (2018.01); *F24F 11/61* (2018.01); *F24F 2130/00* (2018.01); *F24F 2130/10* (2018.01); *F24F 2140/50* (2018.01); *G05B 2219/2642* (2013.01); *H02J 2003/003* (2013.01); *H02J 2003/143* (2013.01); *Y02B 70/3225* (2013.01); *Y02B 70/3241* (2013.01); *Y04S 20/222* (2013.01); *Y04S 20/227* (2013.01)

(58) Field of Classification Search
CPC ........ F24F 11/47; F24F 2130/00; F24F 11/46; F24F 11/61; F24F 2011/0058; F24F 2011/0075; F24F 2011/0073; F24F 2011/0046; F24F 2011/0094; H02J 13/0062; G05B 15/02
See application file for complete search history.

(56) References Cited

FOREIGN PATENT DOCUMENTS

| | | | |
|---|---|---|---|
| JP | 2006029607 A | * | 2/2006 |
| JP | 2006029693 A | * | 2/2006 |
| JP | 2010-32072 A | | 2/2010 |
| JP | 4910020 B2 | | 4/2012 |

* cited by examiner

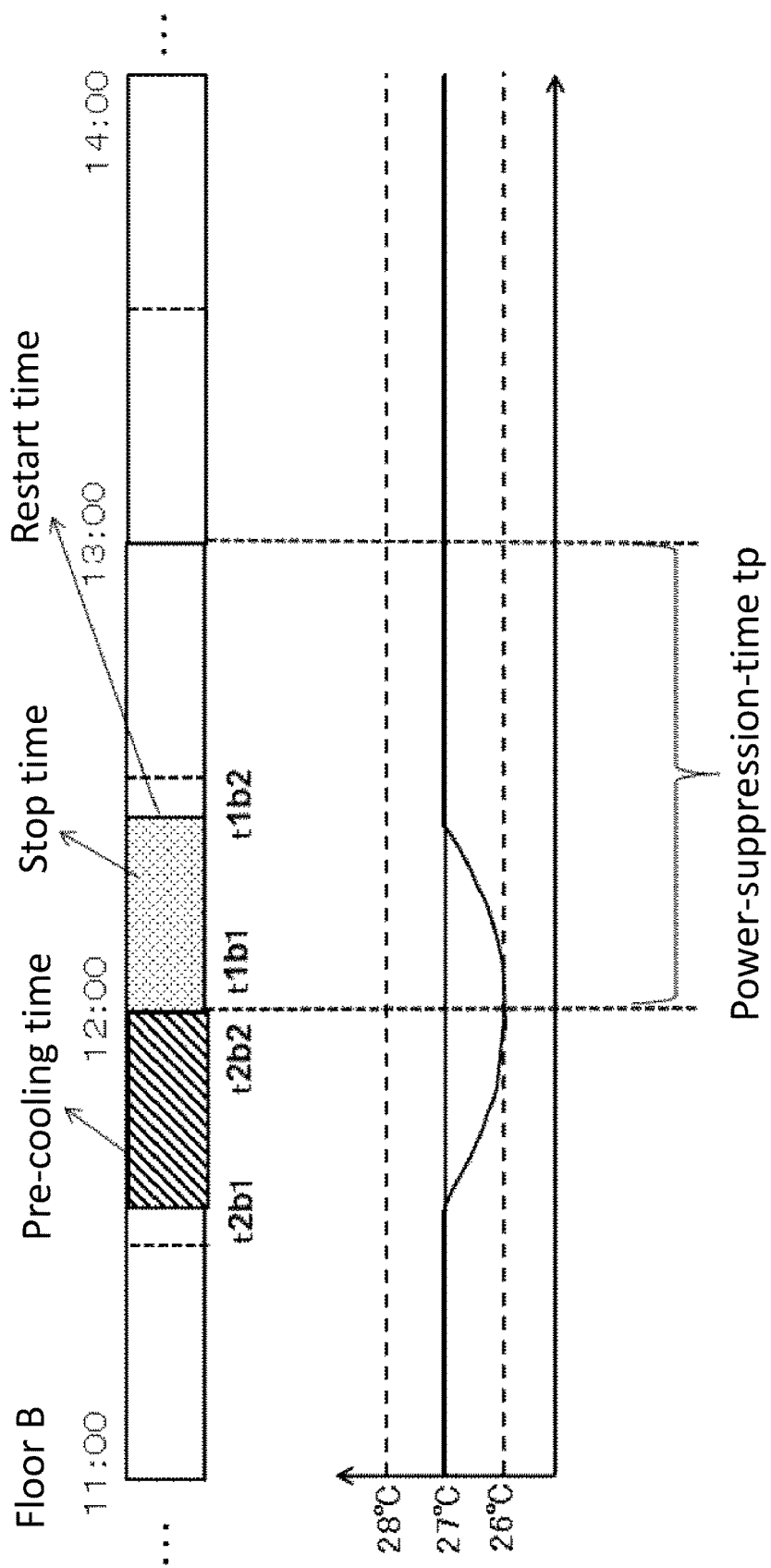

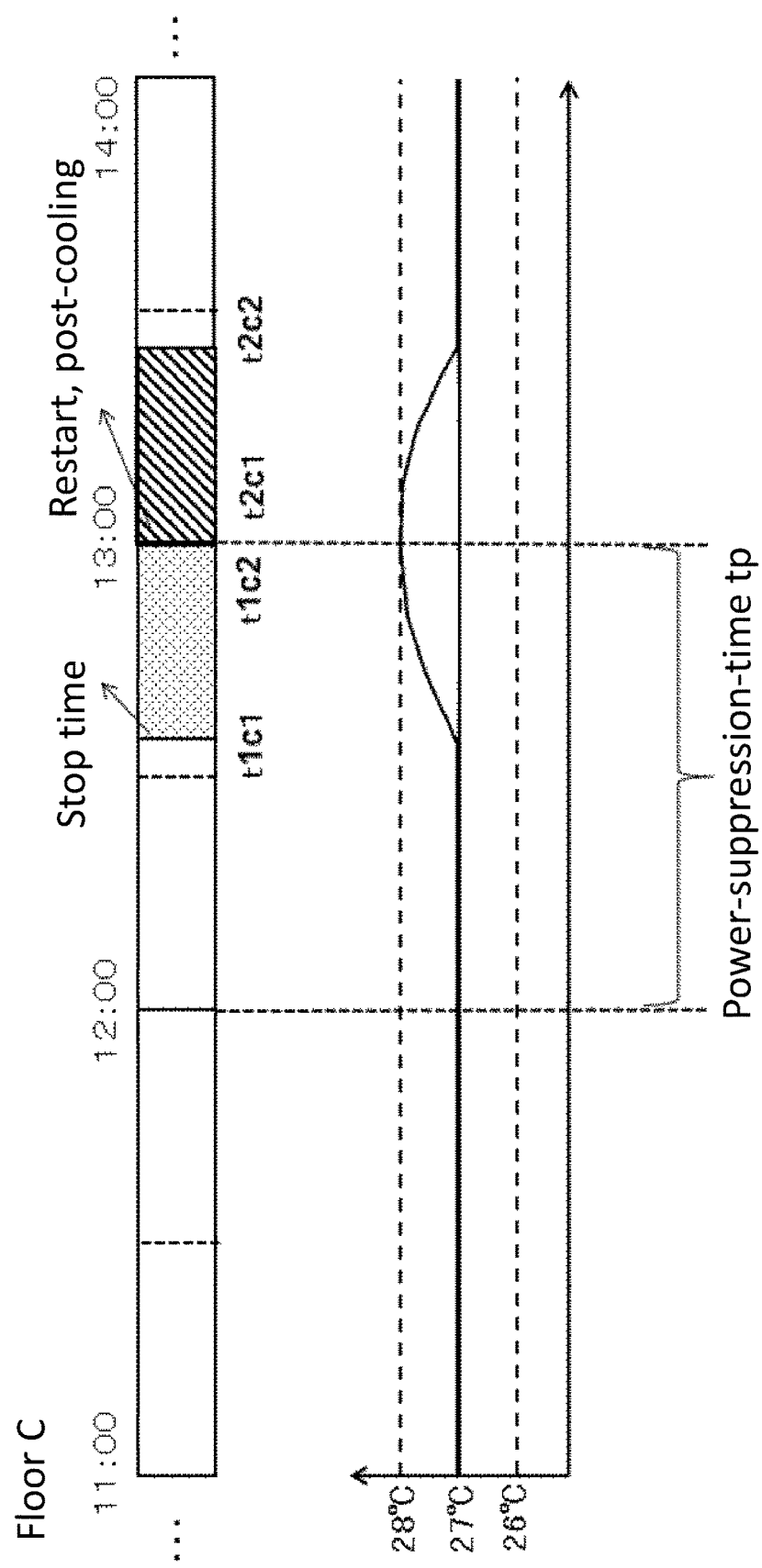

MANAGEMENT SYSTEM AND MANAGEMENT METHOD

TECHNICAL FIELD

The present invention relates to management systems that control equipment in order to manage electric power for consumers such as buildings.

BACKGROUND ART

A conventional consumer energy management system (management system) calculates beforehand a thermal capacity inside a room for which a power demand peak is suppressed to calculate an air conditioner preset temperature to satisfy a power reduction target value. If there is a large temperature change in the preset temperature, the peak is suppressed by performing pre-cooling or pre-heating beforehand (Patent Document 1).

PRIOR ART DOCUMENT

Patent Document

Japanese Patent No. 4910020

SUMMARY OF INVENTION

Technical Problem

Because the air conditioner preset temperature is calculated so as to satisfy the power reduction target value in response to thermal capacity, the consumer sets the temperature to satisfy the power reduction target value; this may cause a large temperature change. Thus, when such a large temperature change occurs, the time required for pre-cooling or pre-heating cannot be estimated in conventional technique; this may, unfortunately, cause the time period for pre-cooling or pre-heating to overlap with the time period when power is to be suppressed, failing to suppress the power demand peak throughout a floor.

The present invention is made to solve the above-mentioned problems, and aims to reduce power, with temperatures (state values) kept within ranges set by consumers, in accordance with a time period when power is suppressed across the consumers or floors.

Solution to Problem

A management system according to the invention includes a change-time calculation unit to calculate, on the basis of collected weather information, an operation record of a device, a state value and an acceptable range set for an area where the device is installed, and power-suppression-time during which electric power is suppressed, change-time during which the state value of the area is changed in response to the power-suppression-time by operations of the device, a schedule generation unit to generate, using the time calculated by the change-time calculation unit, a control-schedule for controlling the device, and a transmission unit to transmit the control-schedule generated by the schedule generation unit.

Advantageous Effects of Invention

According to the invention, on the basis of the collected weather information, the operation record of the device, the state value and the acceptable range set for the area where the device is installed, and the power-suppression-time during which the power is suppressed, the change-time during which the state value of the area is changed in response to the power-suppression-time by the operations of the device is calculated; and the control-schedule for controlling the device is generated using the calculated change-time, and the device is controlled. This enables reduction of the electric power usage with the state value set for the area where the device is installed kept within the range in accordance with the power-suppression-time.

BRIEF DESCRIPTION OF DRAWINGS

FIG. 13 is a display example of a schedule of an air conditioner 21 on a floor B according to the embodiment of the invention.

FIG. 14 is a display example of a schedule of an air conditioner 21 on a floor C according to the embodiment of the invention.

DESCRIPTION OF EMBODIMENT

The embodiment of a management system according to the invention is explained in detail referring to figures. Note that the invention is not limited by the embodiment.

Embodiment

In the embodiment of the invention, a case where a device that changes a state value is, for example, an air conditioning device (air conditioner) is explained. A management system according to the invention calculates, on the basis of collected weather information, an operation record of an air conditioner, a temperature and an acceptable range set for an area (for example, a floor) in which the air conditioner is installed, and a time and period when electric power needs to be suppressed (power-suppression-time), change-time during which the air conditioner operates to change the temperature of the area within the set temperature range in response to thermal characteristics of the area during the power-suppression-time, and generates, using the change-time, control-schedules of air conditioners installed in multiple areas, and controls the air conditioners to suppress demand power of the total areas with the temperature kept within the set range in response to the power-suppression-time. The demand power is an amount of electric power consumed by a consumer per unit time (30 minutes in Japan), which is used to calculate electricity rates. Such a management system is explained below.

In the explanation here, a peak-shift is a shift of a consumption power peak by lowering a set temperature to an acceptable lower limit temperature when an air conditioner is controlled in a cooling function; or alternatively it may be a shift of a power consumption peak by lowering temperature to a predetermined lower limit temperature. When controlling the air conditioner in a heating function, the peak-shift is a shift of a power consumption peak by raising temperature to an acceptable upper limit temperature.

Figure 1:
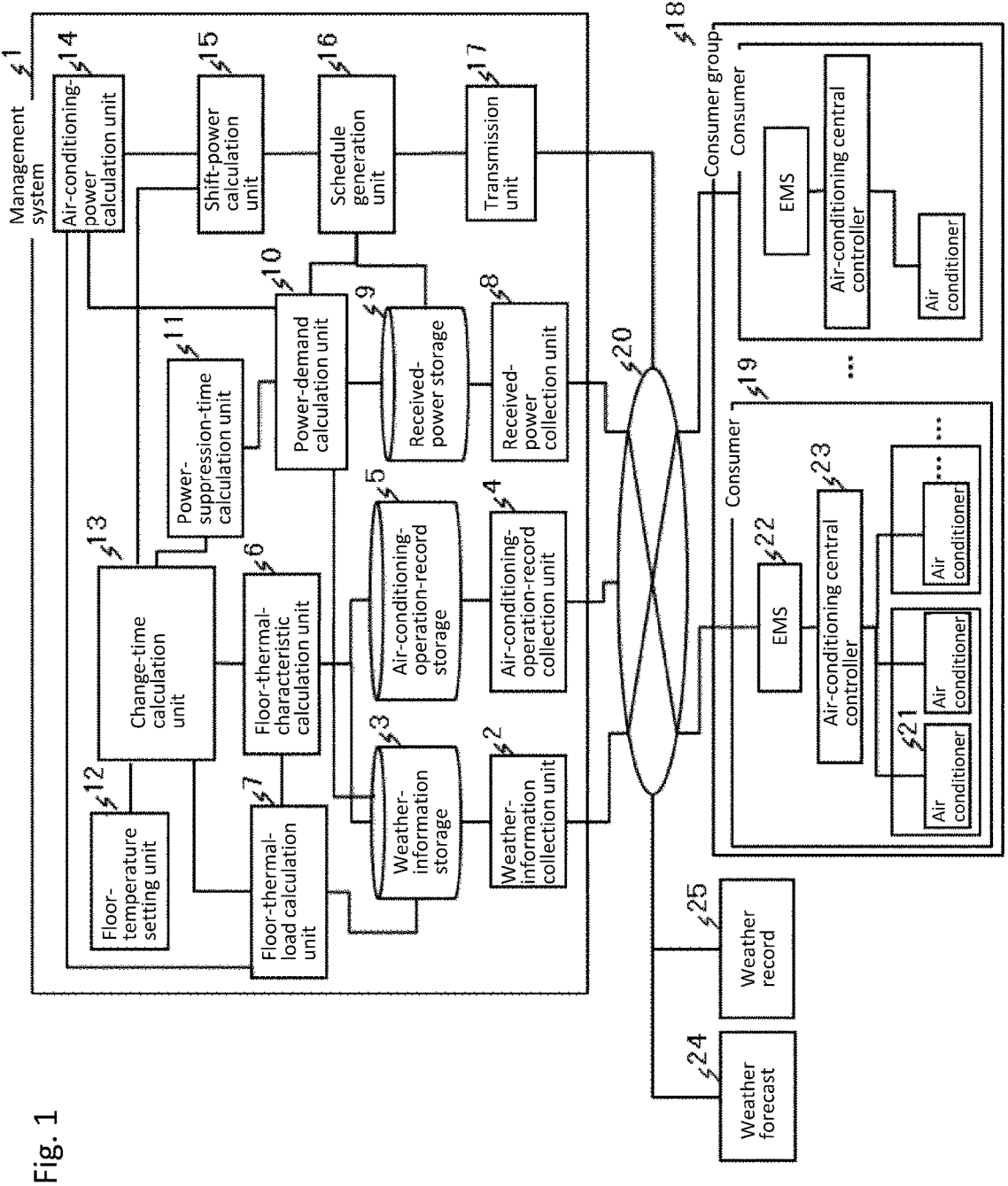
FIG. 1 is a configuration diagram showing a management system 1 according to the embodiment of the invention.

FIG. 1 is a configuration diagram of a management system 1 according to the embodiment of the invention. In FIG. 1, the management system 1 includes a weather-information collection unit 2, a weather-information storage 3, an air-conditioning-operation-record collection unit 4, an air-conditioning-operation-record storage 5, a floor-thermal-characteristic calculation unit 6, a floor-thermal-load calculation unit 7, a received-power collection unit 8, a received-power-record storage 9, a power-demand calculation unit 10, a power-suppression-time calculation unit 11, a floor-temperature setting unit 12, a change-time calculation unit 13, an air-conditioning-power calculation unit 14, a shift-power calculation unit 15, a schedule generation unit 16, and a transmission unit 17. The air-conditioning-operation-record collection unit 4 indicates an operation record collection unit; the air-conditioning-operation-record storage 5 indicates an operation record storage; the floor-thermal-characteristic calculation unit 6 indicates a characteristic calculation unit; and the floor-thermal-load calculation unit 7 indicates a load calculation unit.

The management system 1 is connected to each of consumers 19 in a consumer group 18 by a network 20 such as the Internet and a LAN.

The consumer group 18 means a plurality of consumers 19 such as buildings and factories. Operation records of air conditioners 21 installed in each of the consumers 19 and received-power of each of the consumers 19 are acquired from respective EMS's (Energy Management System) 22 of each of the consumers 19. Each EMS 22 acquires the operation records of air conditioners 21 from an air-conditioning central controller 23 that controls the air conditioners 21, and transmits the acquired operation records to the management system 1. The received-power is a record of electric power usage of an area where a meter is installed on the basis of a contract with a power company, or an amount of power used to calculate electricity charges.

The management system 1 collects weather information of weather forecasts 23 and weather records 24 via the network 20. On the basis of the collected weather information, operation records of air conditioners 21 of a consumer 19, a temperature and an acceptable range for each floor set by an administrator, and power-suppression-time, change-time during which the temperature is changed within the set temperature range by operations of the air conditioners 21 is calculated in response to the power-suppression-time. On the basis of the calculated change-time and the received-power acquired from the consumer 19, time required for a peak-shift by suppressing the power of the consumer 19 is calculated in response to a thermal load during a time period of power suppression of the consumer 19, to generate control-schedules for controlling the air conditioners 21. The generated control-schedules are transmitted to the consumer 1 to control the air conditioners 21.

Figure 2:
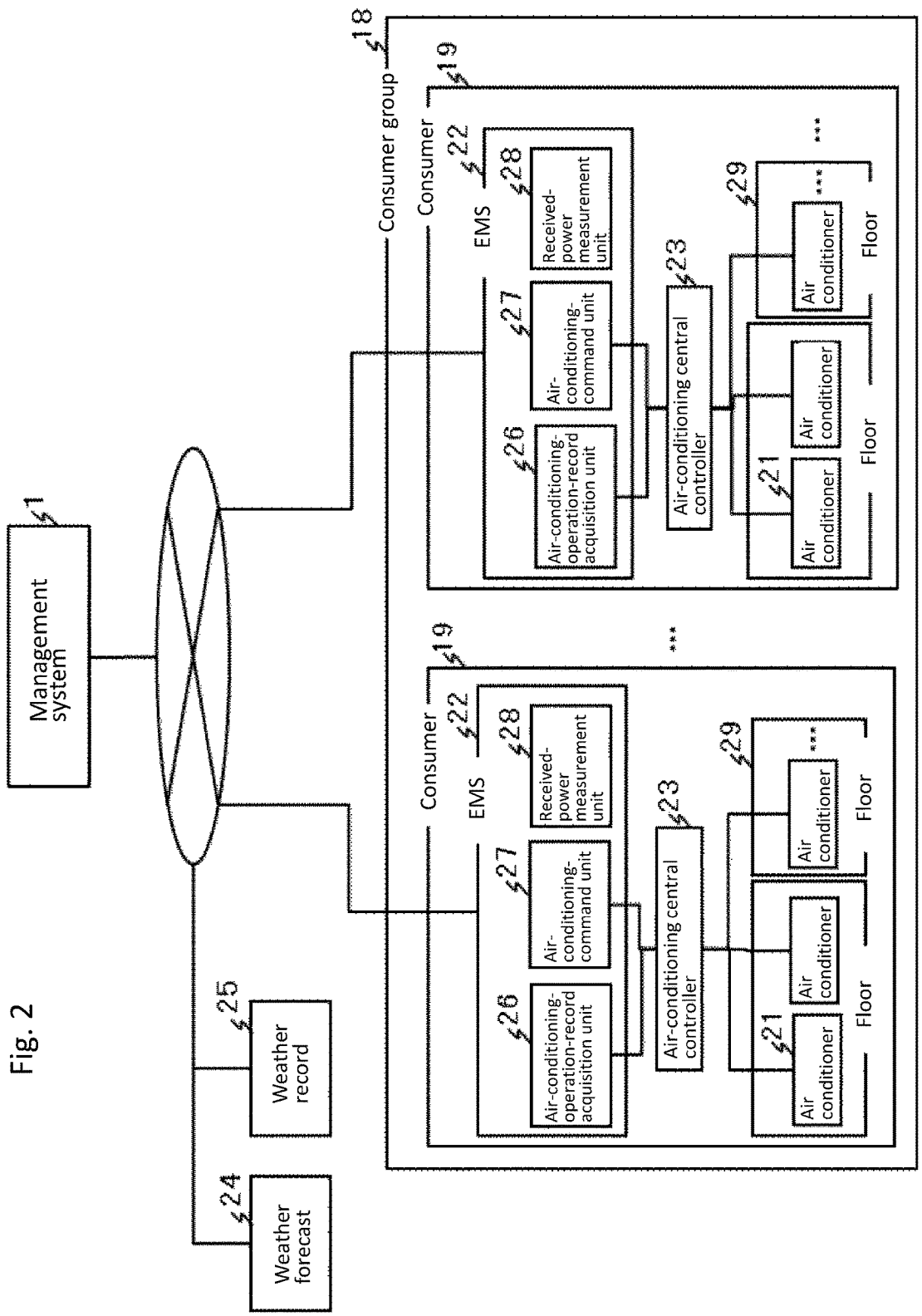
FIG. 2 is a configuration diagram of a consumer group managed by a management system 1 according to the embodiment of the invention.

A configuration of each consumer 19 is explained below. FIG. 2 is a configuration diagram of consumers 19 managed by the management system 1 according to the embodiment of the invention. Each consumer 19 includes an EMS (Energy Management System) 22, an air-conditioning central controller 23, and air conditioners 21. The EMS 22 includes an air-conditioning-operation-record acquisition unit 26, an air-conditioning command unit 27, and a received-power measurement unit 28. The EMS 22 in the consumer 19 acquires operation records of the air conditioners 21 via the air-conditioning central controller 23, measures received-power of the consumer 19, and transmits the operation records and the received-power in response to a transmission request from the management system 1. When receiving control-schedules of the air conditioners 21 from the management system 1, the EMS 22 outputs control commands to the air-conditioning central controller 23 to control the air conditioners 21 so that the air conditioners 21 will operate in accordance with the received control-schedules.

The air-conditioning-operation-record acquisition unit 26 in the EMS 22 acquires the operation records of the air conditioners 21 via the air-conditioning central controller 23, and transmits the acquired operation records to the management system 1. The air-conditioning-operation-record acquisition unit 26 may acquire the operation records when being notified of state change of the air conditioners 21 from the air-conditioning central controller 23. The EMS 22 may accumulate the operation records of the air conditioners 21 for a certain period of time, such as one day, and transmit them to the management system 1.

When receiving the control-schedules of the air conditioners 21 from the management system 1, the air-conditioning command unit 27 in the EMS 22 outputs control commands for the air conditioners 21 to the air-conditioning central controller 23 so that the air conditioners 1 will operate in accordance with the received control-schedule.

The received-power measurement unit 28 in the EMS 22 measures an amount of power consumed by the consumer 19. The measurement may be performed by a meter or by a separately installed power meter. The amount of consumed power is measured by acquisition thereof at a predetermined time interval (for example, an interval of 30-minutes) used to determine a basic charge of electricity rates; and the acquired amount of power is transmitted to the management system 1 as received-power. The received-power measurement unit 28 may sequentially transmit the acquired information on the received-power to the management system 1, or may transmit it to the management system 1 after accumulating it for a certain period of time such as one day. Note that measurement of not only the received-power but also power data of each air conditioner, each floor, or the like will increase the accuracy.

Assume that the consumer 19 has multiple floors 29, and each floor 29 is provided with at least one air conditioner 21. In the explanation here, an area where air conditioners 21 operate is a floor 29. The management system 1 is provided with an operational unit such as a CPU (Central Processing Unit); and the air-conditioning-operation-record collection unit 4, the floor-thermal-load calculation unit 6, the floor-temperature setting unit 7, the change-time calculation unit 8, the power-suppression-time calculation unit 9, the power-demand calculation unit 10, the received-power collection unit 11, the air-conditioning-power calculation unit 13, the shift-power calculation unit 14, the schedule generation unit 15, and the transmission unit 16 run as programs on operation processing. The weather-information storage 3, the air-conditioning-operation-record storage 5, and the received-power-record storage 12 in the management system 1 use a RAM (Random Access Memory), a flash memory, a hard-disk drive, or the like for storage.

Each component in the management system 1 is explained below. In FIG. 1, the weather-information collection unit 2 collects, via the network 20, weather information on a weather forecast 24 and a weather record 25 for a place where air conditioners 21 are installed, and stores it in the weather-information storage 3. The weather-information storage 3 stores the weather forecast 24 and the weather record 25 as the weather information inputted from the weather-information collection unit 2. The weather record 25 is referred to from the floor-thermal-characteristic calculation unit 6, and the weather forecast 24 is referred to from the floor-thermal-load calculation unit 8. The weather forecast 24 and the weather record 25 are also referred to from the power-demand calculation unit 10.

The air-conditioning-operation-record collection unit 4 transmits a transmission request for operation records of air conditioners 21 to an EMS 22 in a consumer 19 via the network 20, collects the operation records of the air conditioners 21 from the EMS 22 in the consumer 19, and stores them in the air-conditioning-operation-record storage 5. The air-conditioning-operation-record storage 5 stores the operation records of the air conditioners 21 inputted from the air-conditioning-operation-record collection unit 4. The operation records of the air conditioners 21 are referred to from the floor-thermal-characteristic calculation unit 6.

The floor-thermal-characteristic calculation unit 6 calculates thermal characteristic values of a floor 29 (floor-thermal-characteristics) on the basis of the weather record 25 of the past (before the present time) stored in the weather-information storage 3 and the past operation records of the air conditioners 21 stored in the air-conditioning-operation-record storage 5. Floor-thermal-characteristics include influence of sunlight or outdoor temperature depending on a floor plan, the number of people on the floor, and influence of heat dissipation from terminal equipment. A thermal network method, for example, is used for calculation. The calculated floor-thermal-characteristics are outputted to the floor-thermal-load calculation unit 7 and the change-time calculation unit 13.

The floor-thermal-load calculation unit 7 calculates, using the information on the floor-thermal-characteristics inputted from the floor-thermal-characteristic calculation unit 6 and the information on the weather forecast 24 acquired from the weather-information storage 3, thermal load values of the floor (floor-thermal-load) after the present time in a form of data of time series (time-series data). The calculated time-series data of the floor-thermal-load is outputted to the change-time calculation unit 13 and the air-conditioning-power calculation unit 14.

The received-power collection unit 8 transmits, via the network 20, a transmission request for data of received-power (received-power data) to EMS's 22 in consumers 19, collects the received-power data from the EMS's 22 in the consumers 19, and stores it in the received-power-record storage 9. The received-power collected by the received-power collection unit 8 is inputted and stored in the received-power storage 9. The received-power is referred to from the power-demand calculation unit 10.

The power-demand calculation unit 10 calculates, using the weather forecast 24 and the weather record 25 stored in the weather-information storage 3, and the received-power stored in the received-power storage 9, time-series data of demand power of each consumer 19. The calculated time-series data of the demand power is outputted to the power-suppression-time calculation unit 11, the air-conditioning-power calculation unit 14, and the schedule generation unit 16.

The power-suppression-time calculation unit 11 calculates power-suppression-time for each consumer 19 using the time-series data of the demand power of each consumer 19 calculated by the power-demand calculation unit 10. In the explanation here, the power-suppression-time is a time interval for a consumer 19 to calculate a basic charge, and a time calculated as the maximum demand power period during which the estimated power consumption becomes maximum, is estimated; or it may be the time for suppressing power designated by a power company or the like supplying power to the consumer.

The floor-temperature setting unit 12 is a user interface with which, for example, an administrator sets a set temperature (set state value) to a floor 29 and an upper limit temperature and a lower limit temperature for the set temperature (acceptable range for the set state value), and stores the set temperatures (the set state value and acceptable range). The temperatures can be individually set for each floor 29 or each air conditioner 21. Values set for the floor-temperature setting unit 12 include standard temperatures and acceptable ranges required for places such as buildings where people work (temperatures required by Law for Maintenance of Sanitation in Buildings), or set temperatures and acceptable ranges uniquely set by manufactures.

The change-time calculation unit 13 acquires floor-thermal-characteristics from the floor-thermal-characteristic calculation unit 6, acquires time-series data of the floor-thermal-load from the floor-thermal-load calculation unit 7, acquires a set temperature and an acceptable range for a floor from the floor-temperature setting unit 12, and acquires power-suppression-time from the power-suppression-time calculation unit 11. The change-time calculation unit 13 calculates, from the acquired floor-thermal-characteristics, the acquired time-series data of the floor-thermal-load, the acquired set temperature and acceptable range for the floor, and the acquired power-suppression-time, a time during which air conditioners 21 change temperature (change-time) in accordance with operation states in the floor 29 where the air conditioners 21 are installed and the thermal load during the power-suppression-time, and outputs the calculated change-time to the shift-power calculation unit 15.

The air-conditioning-power calculation unit 14 calculates, on the basis of the time-series data of the floor-thermal-load inputted from the floor-thermal-load calculation unit 7 and the demand power inputted from the power-demand calculation unit 10, power consumption of the air conditioners 21 required for removing the floor-thermal-load (in response to the floor-thermal-load) in a time series form. The calculated time-series data of the power consumption of the air conditioners 21 is outputted to the shift-power calculation unit 15.

The shift-power calculation unit 15 calculates, on the basis of the change-time calculated by the change-time calculation unit 13 and the time-series data of the air conditioners 21 calculated by the air-conditioning-power calculation unit 14, power consumption of the floor where the air conditioners 21 are installed in a case where the peak time of power consumption within the power-suppression-time is shifted. The calculated power consumption is outputted to the schedule generation unit 16.

The schedule generation unit 16 generates, on the basis of the power consumption inputted from the shift-power calculation unit 15, the demand power inputted from the power-demand calculation unit 10, and the received-power acquired from the received-power storage 9, control-schedules for controlling the air conditioners 21 under the control of the consumer 19 so as to suppress the power consumption of the overall consumer 19 during the power-suppression-time. The generated control-schedules are outputted to the transmission unit 17.

The transmission unit 17, via the network 20, transmits the control-schedules inputted from the schedule generation unit 16 to the EMS's 22 in the consumer 18, and controls the air conditioners 21 via the air-conditioning central controller 23 managed by the EMS. The above is the explanation of the components of the management system 1.

Figure 3:
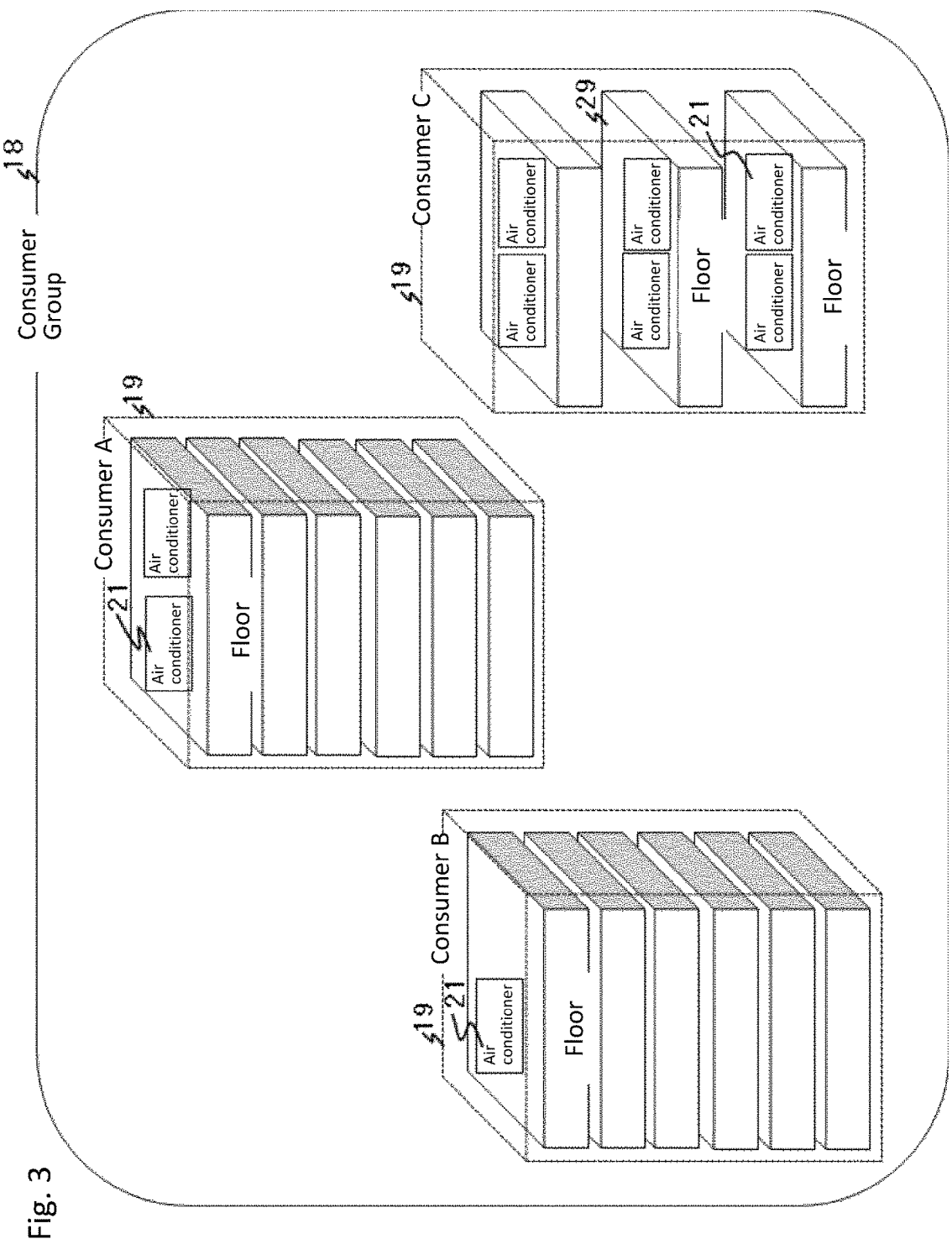
FIG. 3 is a configuration diagram of a consumer group according to the embodiment of the invention.
Figure 4:
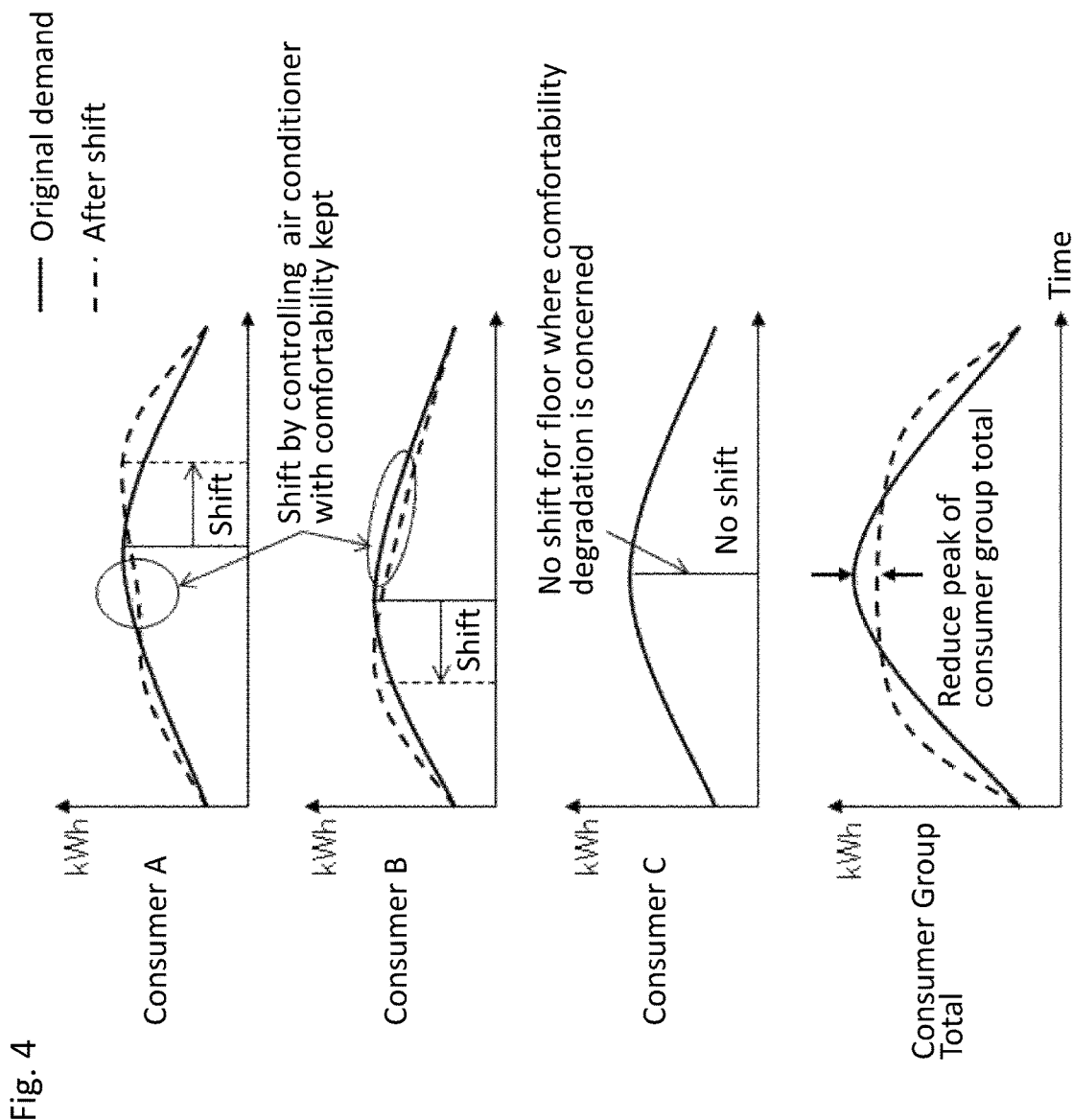
FIG. 4 is a set of graphs explaining operations of a management system 1 according to the embodiment of the invention.

The consumer group 2 is explained below. FIG. 3 is a diagram explaining a consumer group 18 according to the embodiment of the invention. FIG. 4 is a set of graphs explaining how to suppress the demand power in the consumer group 18 according to the embodiment of the invention. Here, a group of consumers A, B and C, such as buildings or factories is explained as a consumer group 18. Assume that air conditioners 21 are installed under the control of the consumers A, B, and C. To suppress the total power of the consumer group 18, the management system 1 generates control-schedules for shifting time during which demand power of air conditioners 21 increases, and transmits the generated control-schedules to the consumers A, B, and C.

A rate system (for high voltage and extra-high voltage) of a power company with which the consumer group 18 contracts consists of, for example, a basic charge and a meter charge. The basic charge portion is determined, for example, by the maximum demand power peak power), which is the largest power-consumption during a single 30 minute period in one year. Reduction of the electricity rates by lowering the basic charge needs continuous suppression of the maximum demand power throughout a year. Thus, to reduce the electricity rates, the consumer group 18 suppresses the maximum demand power for the overall consumer group 18 by shifting demand power suppression periods of the consumers. This method is described below.

As shown in FIG. 4, for example, the peak time of demand power of the consumer A is delayed by controlling air conditioners 21 installed in the consumer A to make temperature and humidity be preset values while maintaining comfortability. As for the consumer B, the peak time of demand power is advanced by controlling air conditioners 21 while maintaining comfortability.

The consumer C determines not to perform a peak-shift because controlling of air conditioners 21 gives a bad influence on comfortability. As described above, peak-shifts in accordance with characteristics of consumers enable peak reduction of the demand power during power-suppression-time for the power of the consumer group 18 (total power of each consumer). The above explains a case for a consumer group that groups multiple consumers; however, for an overall consumer 19, similar peak-shifts performed for floors of the consumer enable peak reduction of demand power during power-suppression-time for the overall consumer 19.

Figure 5:
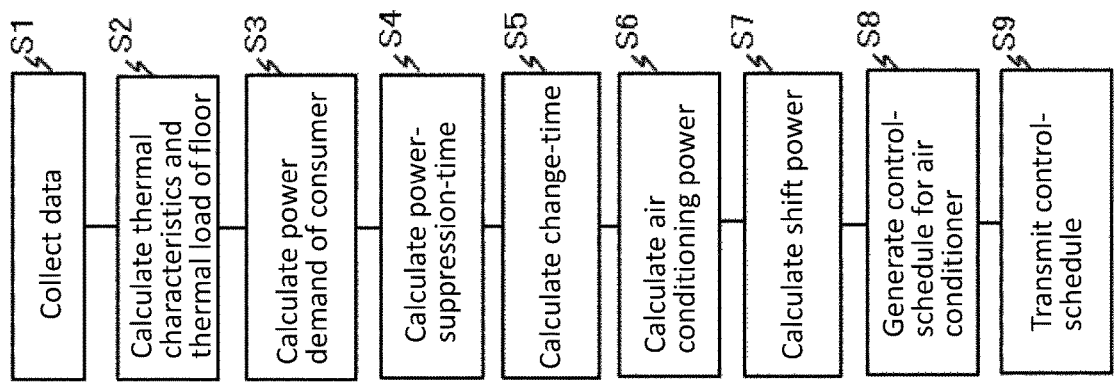
FIG. 5 is a flowchart showing operations of a management system 1 according to the embodiment of the invention.

Operations of the management system 1 are explained below. FIG. 5 is a flowchart showing operations of the management system 1 according to the embodiment of the invention. There is described here an example of a peak-shift for each floor, which is performed for the overall consumer 19, to reduce a demand power peak in power-suppression-time. The weather-information collection unit 2 in the management system 1 collects, via the network 20, weather information on the weather forecast 24 and the weather record 25 with respect to the consumer 19, and stores it to the weather-information storage 3. The air-conditioning-operation-record collection unit 4 transmits to an EMS 22 in the consumer 19, via the network 20, a transmission request for operation records of air conditioners 21 installed in the consumer 19. The operation records of the air conditioners 21 installed in the consumer 19 are collected from the EMS 22 in the consumer 19 and stored in the air-conditioning-operation-record storage 5. The received-power collection unit 8 transmits, via the network 20, a transmission request for received-power to the EMS 22 in the consumer 19. The received-power of the consumer 19 is collected from the EMS 22 in the consumer 19, and stores it in the received-power storage 9 (S1).

The floor-thermal-characteristic calculation unit 6 calculates, on the basis of the weather information acquired from the weather-information storage 3 and the operation records of the air conditioners 21 acquired from the air-conditioning-operation-record storage 5, thermal characteristics of each floor 29 in the consumer 19. The calculated thermal characteristics of each floor 29 in the consumer 19 are outputted to the floor-thermal-characteristic calculation unit 6 and the change-time calculation unit 13. The floor-thermal-load calculation unit 7 calculates, on the basis of the weather information acquired from the weather-information storage 3 and the thermal characteristics of each floor inputted from the floor-thermal-characteristic calculation unit 6, time-series data of a floor-thermal-load of each floor 29 (S2). The calculated time-series data of the floor-thermal-load of each floor is outputted to the change-time calculation unit 13 and the air-conditioning-power calculation unit 14.

The power-demand calculation unit 10 performs, on the basis of the received-power up to the present time received from the received-power storage 9, calculations to estimate demand power of each floor 29 after the present time (S3). The estimated demand power of each floor 29 is outputted to the power-suppression-time calculation unit 11 and the air-conditioning-power calculation unit 14. In the demand power calculation, a highly accurate estimation is enabled by considering influence of weather referring to the information of the weather forecast 24 stored in the weather-information storage 3.

The power-suppression-time calculation unit 11 calculates, on the basis of the demand power of each floor inputted from the power-demand calculation unit 10, the time and unit time period when the power should be suppressed (power-suppression-time), and outputs the calculated power-suppression-time to the change-time calculation unit 13. For example, the time and the unit time that yield maximum total demand power of each floor are calculated.

The change-time calculation unit 13 acquires the thermal characteristics of each floor from the floor-thermal-characteristic calculation unit 6, acquires the time-series data of the floor-thermal-load of each floor from the floor-thermal-characteristic calculation unit 7, acquires a temperature and an acceptable range set for each floor from the floor-temperature setting unit 12, and acquires the power-suppression-time from the power-suppression-time calculation unit 11. The change-time calculation unit 13 calculates, on the basis of the acquired floor-thermal-characteristics, the acquired time-series data of the floor-thermal-load, the acquired set temperature and acceptable range for the floor, and the acquired power-suppression-time, pre-cooling time (change-time for changing temperature) during which each floor is cooled by operations of air conditioners 21 to remove the floor-thermal-load, with the temperature kept within the set range, in response to a floor-thermal-load during the power-suppression-time (S5). The calculated change-time is outputted to the shift-power calculation unit 15.

The air-conditioning-power calculation unit 14 calculates, on the basis of the time-series data of the thermal load of each floor inputted from the floor-thermal-load calculation unit 7 and the demand power of each floor inputted from the demand-power calculation unit 10, power consumption of the air conditioners 21 in response to the thermal load of each floor in a form of time-series data (S6). The calculated time-series data of the power consumption of the air conditioners 21 is outputted to the shift-power calculation unit 15.

The shift-power calculation unit 15 calculates, on the basis of the time-series data of the power consumption of the air conditioners 21 inputted from the air-conditioning-power calculation unit 14 and the change-time inputted from the change-time calculation unit 13, power consumption of the air conditioners 21 in a case where the demand power peak is shifted during the power-suppression-time (S6). The calculated power consumption of the air conditioners 21 in the case where the peak is shifted is outputted to the schedule generation unit 16.

The schedule generation unit 16 generates control-schedules of the air conditioners 21 using the power consumption of the air conditioners 21 in the case where the peak is shifted inputted from the shift-power calculation unit 14, the demand power of the consumer 19 inputted from the power-demand calculation unit 10, and the received-power stored in the received-power-record storage 9 (S7). The generated control-schedules are outputted to the transmission unit 17.

The transmission unit 17 transmits to the EMS 22 in the consumer 19, via the network 20, the control-schedules of the air conditioners 21 inputted from the schedule generation unit 16. Note that, in the explanation here, the change-time of each floor 29 is calculated to suppress the demand power of the consumer 19; however, in order to suppress demand power of a consumer group 18, change-time of each consumer 19 is calculated, control-schedules of the air conditioners 21 installed in each consumer 19 are generated so as to suppress the demand power of the overall consumer group 18, and then the air conditioners 21 are controlled.

As described above, the management system 1 calculates, on the basis of collected weather information, operation records of air conditioners 21 of a consumer 19, a temperature and acceptable range set for an area where the air conditioners 21 are installed, and power-suppression-time, change-time during which the temperature is changed within the set temperature range by the operations of the air conditioners 21 in response to a thermal load during the power-suppression-time. A control-schedule for the air conditioners 21 on each floor 29 is generated using the calculated change-time and the time-series data of the power consumption of the air conditioners 21 in accordance with the thermal load of each floor. The generated control-schedule is transmitted to the consumer 19 to control the air conditioners 21 so as to keep the temperature within the set range in accordance with the power-suppression-time; this enables suppressing the demand power of the overall consumer 19. Because the demand power of the overall consumer 19 is suppressed within the power-suppression-time, in a case where a contract basic charge of electricity rates of the consumer 19 is determined by the maximum demand power, the electricity rates can be reduced.

Figure 6:
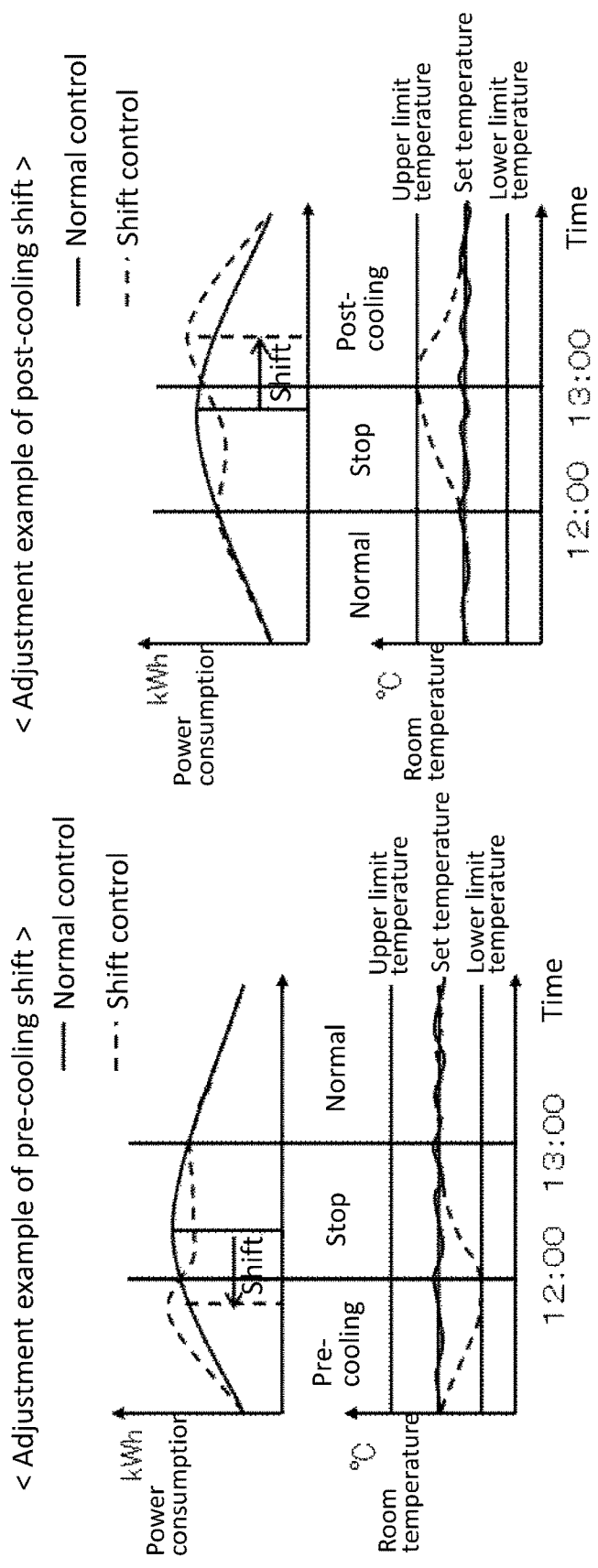
FIG. 6 is a set of graphs explaining two types of peak shifting according to the embodiment of the invention.
Figure 7:
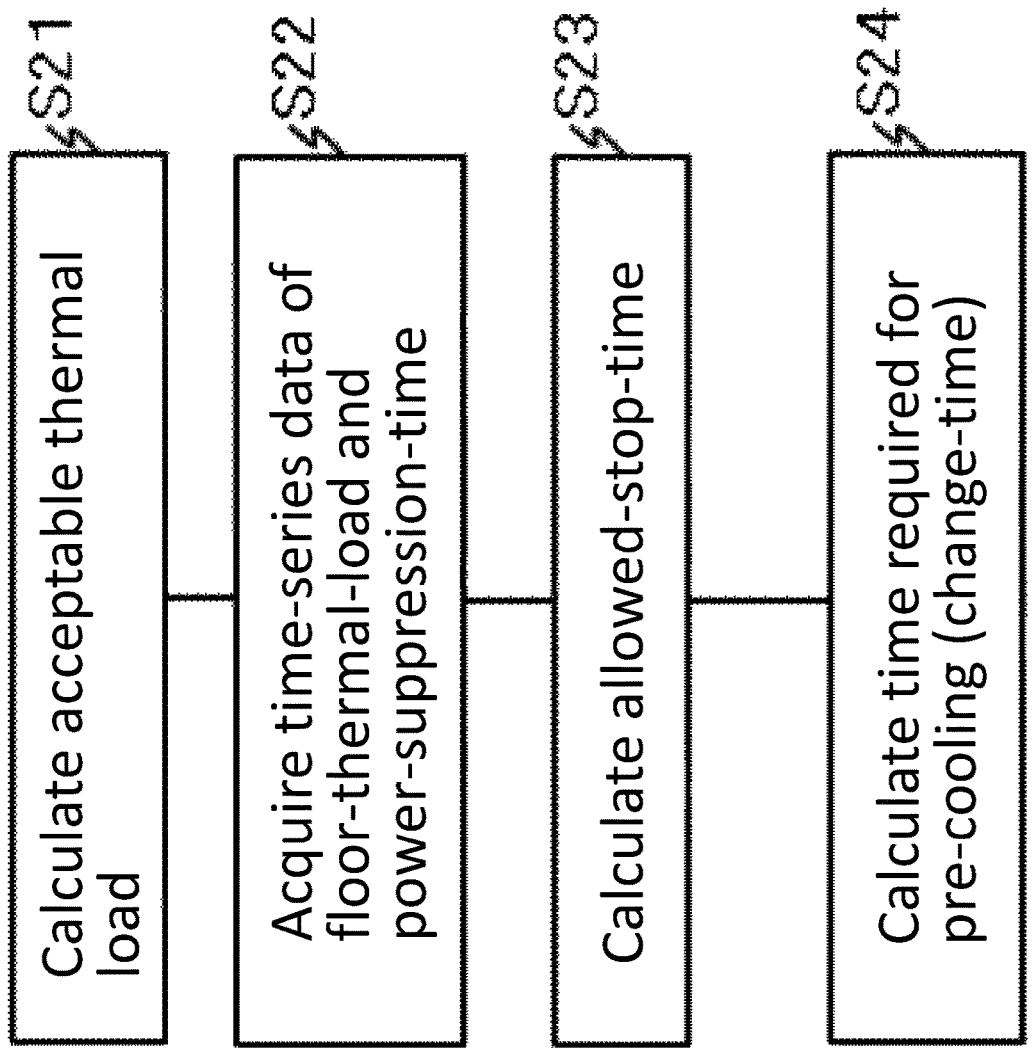
FIG. 7 is a flowchart explaining calculation of stop time according to the embodiment of the invention.

Operations of the change-time calculation unit 13 are explained in detail below. FIG. 6 is a diagram explaining two types of peak shifting according to the embodiment of the invention. FIG. 7 is a flowchart showing operations of the change-time calculation unit 13 according to the embodiment of the invention. In reference to FIG. 6, two types of peak shifting are explained before explaining how the change-time calculation unit 13 operates to perform the shifting. To perform peak-shifts for the total floors 29, the two types shown in FIG. 6, a pre-cooling shift and a post-cooling shift, are combined for each floor.

To perform a pre-cooling shift, an air conditioner 21 is controlled so that a room temperature reaches a lower limit temperature before the power-suppression-time, then the air conditioner 21 is stopped by the power-suppression-time. The air conditioner 21 restarts after the power-suppression-period elapses. In this case, estimation of time required for pre-cooling is important. Inaccurate estimation of the pre-cooling time causes the air conditioner 21, which lowers the room temperature to the lower limit temperature, to stop after starting the power-suppression-time. If the room temperature is not lowered to the lower limit temperature due to the inaccurate estimation of the pre-cooling time, the room temperature rises corresponding to a thermal load accumulated during stop time of the air conditioner 21. Accordingly, when the air conditioner 21 restarts, this yields a bad effect that needs for additional demand power to remove the thermal load accumulated during the stop time.

To perform a post-cooling shift, the air conditioner 21 is stopped before the power-suppression-time; and the air conditioner 21 is restarted after the power-suppression-period elapses. In the case of the post-cooling shift, because the air conditioner 21 is restarted after the power-suppression-period elapses, the air conditioner 21 is normally controlled within a range from a set temperature to an acceptable temperature.

The change-time calculation unit 13 calculates, when the set temperature, the acceptable range, and the power-suppression-time are set for the consumer 19, pre-cooling start time and stop time of the air conditioners 21, keeping the temperature within the set range, in such a way that the demand power does not have a peak during the power-suppression-period.

There is described an algorithm the change-time calculation unit 13 uses to calculate time (change-time for changing temperature) during which room temperature of a floor 29 is lowered by the operations of the air conditioners 21 in response to a thermal load during power-suppression-time. The change-time calculation unit 13 acquires floor-thermal-characteristics of a floor 29 from the floor-thermal-characteristic calculation unit 6, and calculates, using thermal capacity of the floor-thermal-characteristics, a thermal load yielding the acceptable upper limit temperature (acceptable thermal load) by Formula 1 shown below (S21 in FIG. 7).

(acceptable thermal load)=(thermal capacity)×[(upper limit temperature)−(set temperature)]    (Formula 1)

Note that, among the floor-thermal-characteristics acquired from the floor-thermal-characteristic calculation unit 6, thermal capacity is used here; however, in addition to that, thermal resistance may be used.

Figure 8:
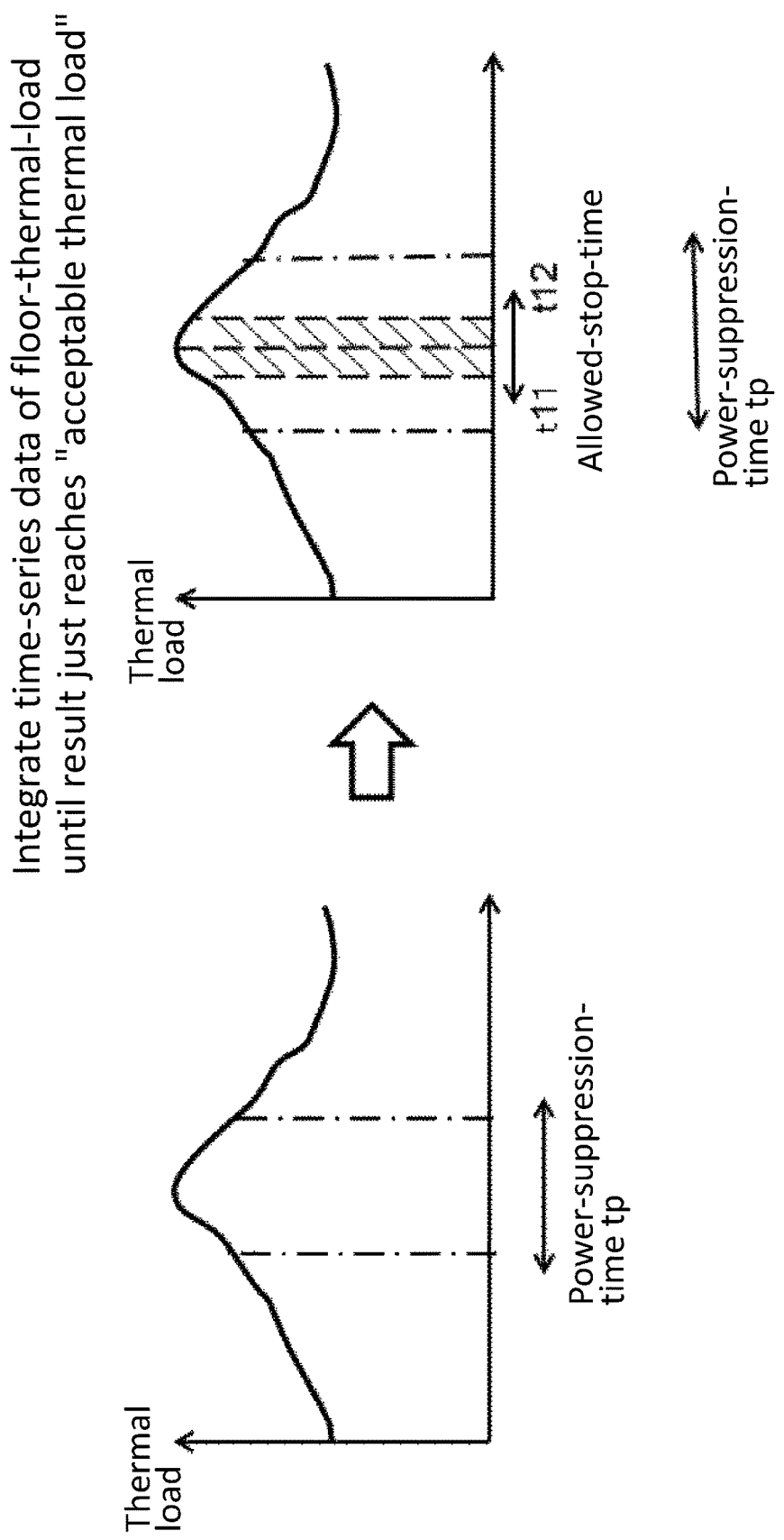
FIG. 8 is a set of graphs explaining time required for a pre-cooling shift according to the embodiment of the invention.

The change-time calculation unit 13 calculates time to stop the air conditioners 21 on the floor 29. FIG. 8 is a set of graphs explaining how to calculate the stop time according to the embodiment of the invention. The change-time calculation unit 13 acquires time-series data of the floor-thermal-load from the floor-thermal-load calculation unit 7, and acquires power-suppression-time tp of the floor 29 from the power-suppression-time calculation unit 11 (S22).

As shown in FIG. 8, the time-series data of the floor-thermal-load is integrated within a range of the power-suppression-time tp. The time integration continues until the result reaches smaller than "the acceptable thermal load" calculated in Formula 1; and the resultant integration interval is calculated as the time during which the air conditioners 21 are allowed to stop (allowed-stop-time) (S23).

Figure 9:
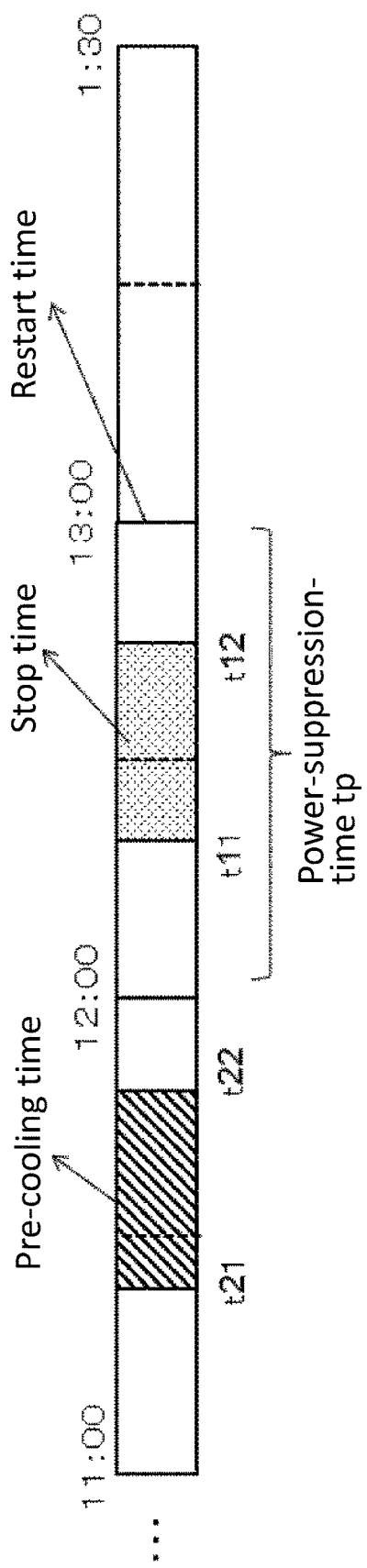
FIG. 9 is an explanation diagram relevant to time for pre-cooling according to the embodiment of the invention.

Time required for a pre-cooling shift is explained below. FIG. 9 is an explanatory diagram relevant to pre-cooling time according to the embodiment of the invention. Assume that a time interval set for calculation of a basic charge of electricity rates is, for example, 30 minutes. Assume that the power-suppression-time tp is from 12:00 to 13:00, and the allowed-stop-time is from t11 to t12 between 12:00 and 13:00. Pre-cooling time of the pre-cooling shift should be set prior to a start time of the power-suppression-time tp, and the pre-cooling should end at time before 12:00 in an increment of 30 minutes, which is a time unit set for calculation of the basic charge of electricity. Thus, it is necessary to calculate the time required for the pre-cooling, and to start the pre-cooling earlier by the calculated time required for the pre-cooling. In FIG. 9, the time from t21 to t22 is the time required for the pre-cooling; and the pre-cooling start time t21 and the pre-cooling time from t21 to t22 are calculated so as to set t22 before 12:00.

Figure 10:
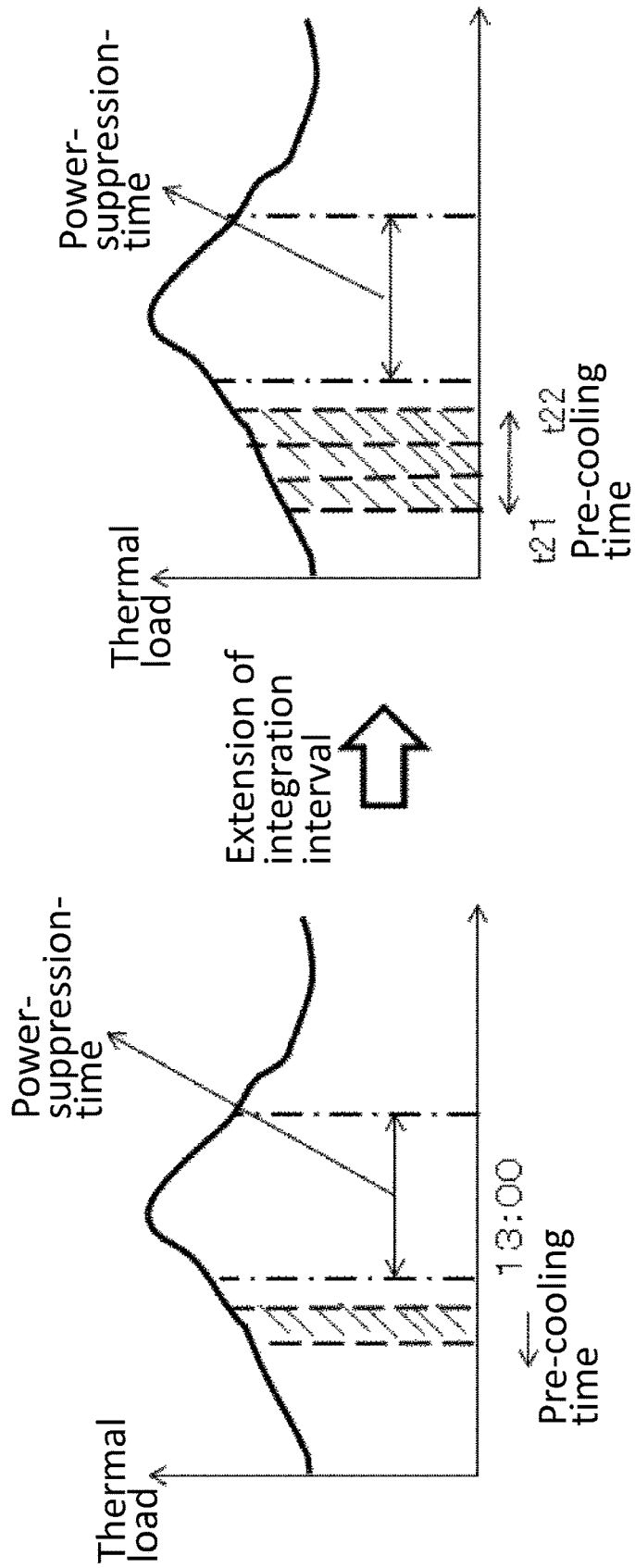
FIG. 10 is a set of graphs explaining calculation of time required for pre-cooling according to the embodiment of the invention.

FIG. 10 is a set of graphs explaining how to calculate the time required for the pre-cooling according to the embodiment of the invention. The time required for the pre-cooling is the time required for removing "the acceptable thermal load" calculated by Formula 1. The thermal load subject to the pre-cooling is calculated by Formula 2 below.

(thermal load subject to pre-cooling)=(thermal capacity)×[(set temperature)−(lower limit temperature)]   (Formula 2)

As shown in FIG. 10, the completion time of the pre-cooling t22 is set prior to the start time of the power-suppression-time (12:00 in FIG. 9). Time integration is performed from the completion time t22 of the pre-cooling using the time-series data of the floor-thermal-load. As a result of the integration, the time when "the thermal load subject to pre-cooling" becomes equal to or larger than "the acceptable thermal load" is the pre-cooling start time t21.

As described above, the change-time calculation unit 13 calculates, in accordance with the floor-thermal-load during the power-suppression-time, the pre-cooling start time t21 of the air conditioners 21 and the pre-cooling time from t21 to t22, which is the time required for pre-cooling (change-time for changing temperature) (S24). As explained above, the change-time calculation unit 13 calculates, in response to the thermal load of the floor 29, time allowing the air conditioners 21 to stop during the power-suppression-time, and determines "an acceptable thermal load" during the time allowing the stop as "a thermal load subject to pre-cooling". The time required for "the thermal load subject to pre-cooling" is calculated by integrating the time-series data of the floor-thermal-load from the time before the power-suppression-time and earlier by a unit time for calculating the basic charge of electricity, to obtain the change time.

The above explains the case of the pre-cooling; in the case of a post-cooling shift, air conditioners 21 are stopped after the power-suppression-time. Thus, on the basis of the change-time, the time from restarting the air conditioners 21 is calculated so as to remove the thermal load accumulated during the time when the air conditioners 21 have been stopped (the allowed-stop-time), which is between the stop time before the power-suppression-time and the restart time after the power-suppression-time. The change-time calculation unit 13 outputs to the shift-power calculation unit 15, the change-time and the pre-cooling time calculated as the aforementioned.

The shift-power calculation unit 15 is explained below. The shift-power calculation unit 15 calculates, using the change-time inputted from the change-time calculation unit 13 and the time-series data of power consumption of air conditioners 21 inputted from the air-conditioning-power calculation unit 14, demand power in the case where a peak-shift is performed (shift-power) for each floor 29. The calculated shift-power and the pre-cooling time to be shifted are outputted to the schedule generation unit 16. Note that, it is described here that the demand power for the overall consumer 19 can be reduced during the power-suppression-time; however, a peak-shift for each consumer 19 enables demand power reduction of the overall consumer group 1 during the power-suppression-time.

Figure 11:
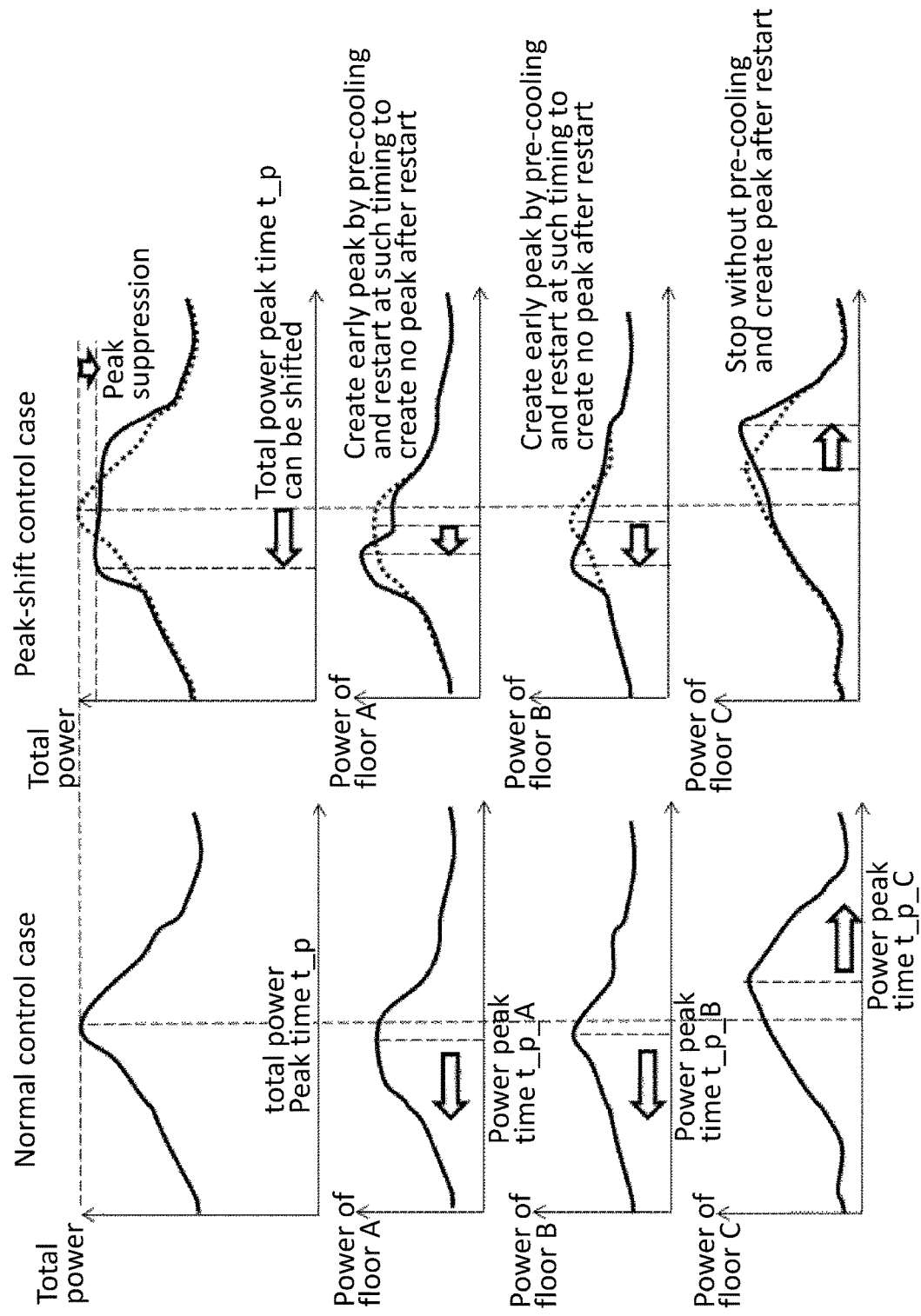
FIG. 11 is a set of graphs explaining a schedule generation unit 16 according to the embodiment of the invention.

The schedule generation unit 16 is explained. FIG. 11 is a set of graphs explaining the schedule generation unit 16 according to the embodiment of the invention. Assume that the consumer 19 has a floor A, a floor B, and a floor C. The left side of FIG. 11 shows power consumptions of normally controlled air conditioners 21 on the floors A, B, and C, and a total power consumption of air conditioners 21 controlled on the floors A, B, and C.

The schedule generation unit 16 receives, from the shift-power calculation unit 15, shift-power and pre-cooling shift time with respect to the floors A, B, and C, receives from the power-demand calculation unit 10 power consumption of each floor calculated on the basis of the weather forecast 24. On the basis of the received shift-power, the received pre-cooling shift time and the received power consumption with respect to the floors A, B, and C, schedules for the air conditioners 21 on the floors A, B, and C are generated to suppress the total power consumption of the total floors (the consumer 19) during power-suppression-time.

The schedules generated in such a manner are shown on the right of FIG. 11. For the air conditioners 21 on the floor A, a schedule of pre-cooling shift is generated. For the air conditioners 21 on the floor B, a schedule of a pre-cooling shift is generated which starts the pre-cooling earlier than the time of the pre-cooling shift on the floor A. For the air conditioners 21 on the floor C, a schedule of a post-cooling shift is generated.

Figure 12:
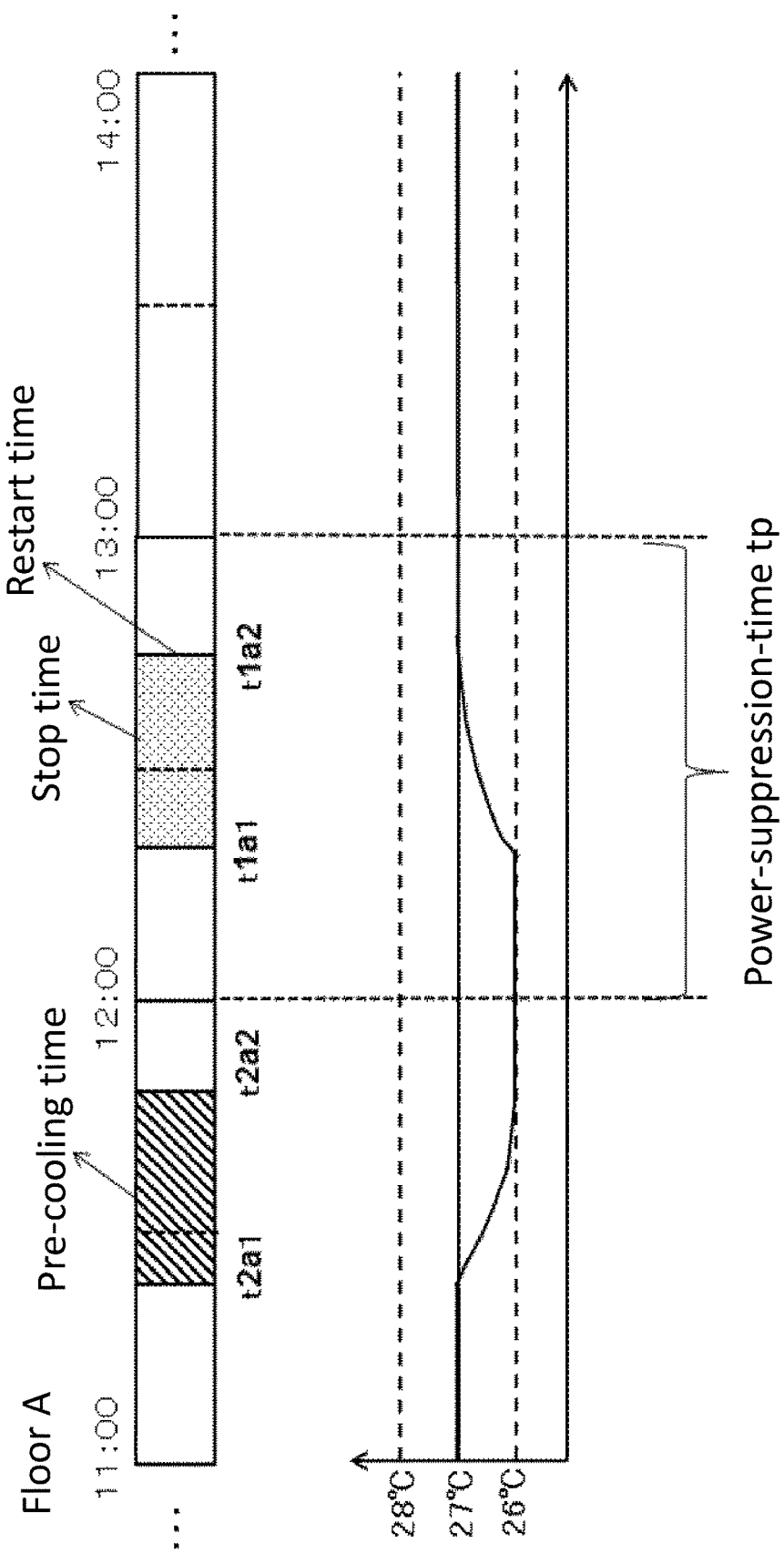
FIG. 12 is a display example of a schedule of an air conditioner 21 on a floor A according to the embodiment of the invention.

FIG. 12 is a display example of a schedule for the air conditioners 21 on the floor A according to the embodiment of the invention. The management system 1 generates a schedule to stop the air conditioners 21 on the floor A of the consumer 19 during time from t1a1 to t2a2 with temperature kept within a set range during power-suppression-time tp. For the floor A, the pre-cooling time of the air conditioners 21 from t2a1 to t2a2 is set so as to end the pre-cooling at the time t22 that is before the start time of the power-suppression-time tp. The management system 1 calculates, in response to a thermal load accumulated during the time from t11 to t12 in which the air conditioners 21 on the floor A stop with the temperature kept within the set range, change-time from t21 to t22 required for the pre-cooling.

FIG. 13 is a display example of a schedule for the air conditioners 21 on the floor B according to the embodiment of the invention. The management system 1 sets, on the floor B of the consumer 19, the pre-cooling time of the air conditioners 21 from t2b1 to t2b2 so as to end the pre-cooling at the time t2b2 that is just before the start time of the power-suppression-time tp. The management system 1 calculates, in response to a thermal load accumulated during the time from t1b1 to t1b2 in which the air conditioners 21 on the floor B stop with temperature kept within a set range, change-time from t2b1 to t2b2 required for the pre-cooling.

FIG. 14 is a display example of a schedule for the air conditioners 21 on the floor C according to the embodiment of the invention. The management system 1 sets, for the floor C of the consumer 10, post-cooling time of the air conditioners 21 from t2c1 to t2c2 so as to start the post-cooling at the time t2c1 that is just after the end time of the power-suppression-time tp. The management system 1 calculates, in response to a thermal load accumulated during the time from t1c1 to t1c2 in which the air conditioners 21 on the floor C stop with temperature kept within a set range, change-time from t2c1 to t2c2 required for the post-cooling. As described above, the management system 1 generates control schedules for the air conditioners 21 on each of the floors A, B, and C. Returning to the change-time calculation, while repeating from the calculation to the control-schedule generation, a control-schedule is generated for each floor so as to minimize the power consumption of the overall consumer 19 including the floors A, B, and C.

The management system 1 according to the invention calculates in advance a thermal load of a floor to be accumulated while air conditioners 21 stop with temperature kept within a set range during the power-suppression-time tp, calculates change-time required for removing the thermal load, and sets pre-cooling time. This enables controlling the air conditioners 21, with the temperature of the floor kept within the set range, so as to end the pre-cooling before the start time of the power-suppression-time tp.

Note that, after generation of a post-cooling shift schedule for the floor C, if an increase in the thermal load during the power-suppression-time due to such as a sudden rise of ambient temperature is expected on the basis of constantly collected weather information of the weather forecast 24 and the weather record 25, the schedule generation unit 16 regenerates a schedule so that air conditioners restart just after the power-suppression-time ends for post-cooling for the floor C. Then, to adjust the pre-cooling time for the floor A and floor B, which perform pre-cooling shifts, in accordance with the schedule for the floor C, the processing is returned to the change-time calculation unit 13. The change-time calculation unit 13 recalculates the change-time to adjust the pre-cooling time; and the schedule generation unit 16 regenerates, using the recalculated change-time, schedules to stop the air conditioners during the power-suppression-time. As described above, in accordance with the expected thermal load, the processing is repeated from the change-time calculation S5 to the generation of air conditioner control-schedule S8.

In the explanation here, a control-schedule is generated for the air conditioners 21 on each floor 29; however, a control-schedule for controlling the air conditioners 21 of each consumer 19 may be generated to suppress the power consumption of the overall consumer group 18 during the power-suppression-time.

If there is a floor 29 with air conditioners whose stop time is extremely short, the air conditioners 21 will start and stop their operations in a short time; this may inhibit achieving an expected power saving effect. In such a case, a schedule may be generated which preferentially selects and controls a floor that allows the air conditioners to stop for a time as long as possible. After the schedule generation unit 16 generates the schedule, the processing returns to the change-time calculation unit 13. The change-time calculation unit 13 recalculates the change-time so that the power allocated for the floor that allows the air conditioners to stop for a long time will be suppressed in the other floors; and the schedule generation unit 16 regenerates the schedule.

Whether or not a floor should be controlled can be optimized using a criterion such as a load factor and a diversity factor. In reference to current contract power (the maximum demand power of the past one year) acquired from the received-power storage 9, and in consideration of a saving effect of electricity rates, a schedule performing no peak-shift operation can be generated. Also, in reference to a target contract power set for the schedule generation unit 16 or with an added electricity-rate calculation unit, if disadvantage of an increased meter charge surpasses advantage of a peak reduction, no control of air conditioners 21 is possible.

As described above, the management system 1 calculates, on the basis of collected weather information, operation records of the air conditioners 21, a set temperature and an acceptable range, and power-suppression-time, change-time during which the temperature is changed within the set temperature range by the operations of the air conditioners 21 in response to a thermal load during the power-suppression-time, and controls each air conditioner 21 referring to the calculated change-time. This enables power suppression with the temperature kept within the range set for an overall consumer in accordance with the power-suppression-time.

In the explanation here, a device for which the management system 1 calculates change-time is an air conditioner 21, and a control-schedule is generated for controlling the air conditioner 21; however, the device may be a lighting device, or may be an electric device such as a rechargeable notebook PC (Personal computer). In addition, in conjunction with battery equipment, the battery equipment may be controlled to be operated in accordance with the power-suppression-time; or a schedule to utilize power of the battery equipment may be generated.

In the case of a lighting device, time during which illumination is lowered from predetermined illumination to acceptable illumination is calculated as change-time. Floor-thermal-characteristics are calculated as floor characteristics depending on a weather state. A floor-thermal-load is calculated as a floor-thermal-load depending on a weather state or time. The change-time is calculated on the basis of the floor characteristics, the floor-load, the predetermined illumination and acceptable illumination for the floor, and the power-suppression-time.

INDUSTRIAL APPLICABILITY

As described above, the management system and the management method according to the invention calculate, on the basis of collected weather information, an operation record of a device in a consumer, a state value and an acceptable range set for an area where the device is installed, and power-suppression-time, change-time during which the state value is changed in response to the power-suppression-time by operation of the device, generate a control-schedule for controlling each device referring to the change-time, and control each device. This enables power suppression for multiple areas (for example, an overall building) with the state value kept within a set range in accordance with the power-suppression-time.

REFERENCE NUMERALS

1: management system, 2: the weather-information collection unit,
3: weather-information storage,
4: air-conditioning-operation-record collection unit,
5: air-conditioning-operation-record storage,
6: floor-thermal-characteristic calculation unit,
7: floor-thermal-load calculation unit,
8: received-power collection unit, 9: received-power storage,
10: power-demand calculation unit,
11: power-suppression-time calculation unit,
12: floor-temperature setting unit, 13: change-time calculation unit,
14: air-conditioning-power calculation unit,
15: shift-power calculation unit, 16: schedule generation unit,
17: transmission unit, 18: consumer group, 19: consumer,
20: network, 21: air conditioner,
22: EMS, 23: air-conditioning central controller, 24: weather forecast,
25: weather record, 26: air-conditioning-operation-record acquisition unit,
27: air-conditioning command unit, 28: received-power measurement unit,
29: floor

The invention claimed is:

1. A management system managing the operation of at least one air conditioning device, the system comprising:
a change-time calculator to calculate, on a basis of collected weather information, an operation record of the air conditioning device, an atmospheric state value and an upper limit and a lower limit of the atmospheric state value set for an area where the air conditioning device is installed, and power-suppression-time during which electric power consumption to be supplied to the air conditioning device should be suppressed, a change-time prior to the power-suppression-time during which the atmospheric state value of the area is changed to precondition the area to prepare for the effect of air conditioning suppression as a result of the power-suppression-time by the air conditioning device;
a schedule generator to generate, using the time calculated by the change-time calculator, a control-schedule for controlling the air conditioning device;
a transmitter to transmit the control-schedule generated by the schedule generator to the air conditioning device which utilizes the control-schedule to reduce usage during the power-suppression-time;
a characteristic calculator to calculate, from the collected weather information and the operation record of the device, a thermal capacity of the area where the air conditioning device is installed; and
a load calculator to calculate, from the thermal capacity calculated by the characteristic calculator and the collected weather information, time-series data of a thermal load of the area where the air conditioning device is installed,
wherein the change-time calculator calculates an acceptable thermal load, using the thermal capacity calculated by the characteristic calculator, the upper limit and the lower limit of the atmospheric state value, and set temperature, and integrates the time-series data of the thermal load calculated by the load calculator until the result reaches smaller than the acceptable thermal load within a range of the power-suppression-time, and calculates the resultant integration interval as the time during which the air conditioning device is allowed to stop.

2. The management system according to claim 1, further comprising:
a weather-information collector to collect weather information including a weather forecast and a weather record;
a weather-information storage to store the weather information collected by the weather-information collector;
an operation-record collector to collect the operation record of the air conditioning device; and an operation-record storage to store the operation record of the air conditioning device collected by the operation-record collector, wherein the characteristic calculator calculates the characteristic on a basis of the weather information stored in the weather-information storage and the operation record stored in the operation-record storage; and
the load calculator calculates the time-series data of the thermal load using the weather-information stored in the weather-information storage.

3. The management system according to claim 1,
the management system further comprises a shift-power calculator to calculate, on a basis of the change-time calculated by the change-time calculator and an amount of electric power consumption of the air conditioning device in response to the thermal load, electric power in a case where the amount of electric power consumption of the air conditioning device in response to the power-suppression-time is shifted, and
the schedule generator generates the schedule on a basis of the power calculated by the shift-power calculator and the amount of electric power consumption of the area where the air conditioning device is installed.

4. The management system according to claim 2,
the management system further comprises a shift-power calculator to calculate, on a basis of the change-time calculated by the change-time calculator and an amount of electric power consumption of the air conditioning device in response to the thermal load, electric power in a case where the amount of electric power consumption of the air conditioning device in response to the power-suppression-time is shifted, and
the schedule generator generates the schedule on a basis of the power calculated by the shift-power calculator and the amount of electric power consumption of the area where the air conditioning device is installed.

5. The management system according to claim 3, further comprises a power-suppression-time calculator to calculate, on a basis of an electric power consumption record for the area where the air conditioning device is installed and the weather information, an amount of electric power consumption of the area where the air conditioning device is installed, and to calculate, on a basis of the calculated consumption amount, the power-suppression-time during which the electric power consumption of the air conditioning device is suppressed, and
the change-time calculator calculates the change-time on a basis of the power-suppression-time calculated by the power-suppression-time calculator.

6. The management system according to claim 3, further comprises an air-conditioning-power-calculator to calculate, using the time-series data of the load calculated by the load calculator, time-series data of power consumption of the air conditioning device, and the shift-power calculator calculates, on a basis of the time-series data of power consumption calculated by the air-conditioning-power calculator, the electric power in a case where the amount of electric power consumption of the air conditioning device in response to the power-suppression-time is shifted.

7. A management method in a management system for managing electric power of a consumer in which at least one air conditioning device is installed, the method comprising:

a change-time calculation step of calculating, on a basis of collected weather information, an operation record of the air conditioning device, an atmospheric state value and an upper limit and a lower limit of the atmospheric state value set for an area where the air conditioning device is installed, and power-suppression-time during which electric power consumption to be supplied to the air conditioning device should be suppressed, a change-time prior to the power-suppression-time during which the device operates to change the atmospheric state value of the area to precondition the area to prepare for the effect of air conditioning suppression as a result of the power-suppression-time;

a schedule generation step of generating, using the time calculated by the change-time calculation step, a control-schedule for controlling the air conditioning device; and a transmission step of transmitting the control-schedule generated by the schedule generation step to the air conditioning device which utilizes the control-schedule to reduce usage during the power-suppression-time;

a first calculating, from the collected weather information and the operation record of the device, a thermal capacity of the area where the air conditioning device is installed;

a second calculating to calculate, from the thermal capacity calculated by the first calculating and the collected weather information, time-series data of a thermal load of the area where the air conditioning device is installed, wherein the change-time calculation step calculates an acceptable thermal load, using the thermal capacity calculated by said first calculating, the upper limit and the lower limit of the atmospheric state value, and set temperature, and integrates the time-series data of the thermal load calculated by the second calculating until the result reaches smaller than the acceptable thermal load within a range of the power-suppression-time, and calculates the resultant integration interval as the time during which the air conditioning device is allowed to stop.

8. A management system managing the operation of at least one air conditioning device, the system comprising:

a change-time calculator to calculate, on a basis of collected weather information, an operation record of the air conditioning device, an atmospheric state value and an upper limit and a lower limit of the atmospheric state value set for an area where the air conditioning device is installed, and power-suppression-time during which electric power consumption to be supplied to the air conditioning device should be suppressed, a change-time prior to the power-suppression-time during which the atmospheric state value of the area is changed to precondition the area to prepare for the effect of air conditioning suppression as a result of the power-suppression-time by the air conditioning device;

a schedule generator to generate, using the time calculated by the change-time calculator, a control-schedule for controlling the air conditioning device;

a transmitter to transmit the control-schedule generated by the schedule generator to the air conditioning device which utilizes the control-schedule to reduce usage during the power-suppression-time;

a characteristic calculator to calculate, from the collected weather information and the operation record of the air conditioning device, a thermal capacity of the area where the air conditioning device is installed; and a load calculator to calculate, from the thermal capacity calculated by the characteristic calculator and the collected weather information, time-series data of a thermal load of the area where the air conditioning device is installed, wherein the change-time calculator calculates an acceptable thermal load, using the thermal capacity calculated by the characteristic calculator, the upper limit and the lower limit of the atmospheric state value, and set temperature, and performs time integration from a completion time of the preconditioning using the time-series data of the thermal load calculated by the load calculator, and calculates the time when the thermal load subject to preconditioning becomes equal to or larger than the acceptable thermal load as a preconditioning start time.

9. A management method in a management system for manacling electric power of a consumer in which at least one air conditioning device is installed, the method comprising:

a change-time calculation step of calculating, on a basis of collected weather information, an operation record of the air conditioning device, an atmospheric state value and an upper limit and a lower limit of the atmospheric state value set for an area where the air conditioning device is installed, and power-suppression-time during which electric power consumption to be supplied to the air conditioning device should be suppressed, a change-time prior to the power-suppression-time during which the device operates to change the atmospheric state value of the area to precondition the area to prepare for the effect of air conditioning suppression as a result of the power-suppression-time;

a schedule generation step of generating, using the time calculated by the change-time calculation step, a control-schedule for controlling the air conditioning device; and a transmission step of transmitting the control-schedule generated by the schedule generation step to the air conditioning device which utilizes the control-schedule to reduce usage during the power-suppression-time;

a first calculating, from the collected weather information and the operation record of the device, a thermal capacity of the area where the air conditioning device is installed; and a second calculating to calculate, from the thermal capacity calculated by the first calculating and the collected weather information, time-series data of a thermal load of the area where the air conditioning device is installed, wherein the change-time calculation step calculates an acceptable thermal load, using the thermal capacity calculated by said first calculating, the upper limit and the lower limit of the atmospheric state value, and set temperature, and performs time integration from a completion time of the preconditioning using the time-series data of the thermal load calculated by the second calculating, and calculates the time when the thermal load subject to preconditioning becomes equal to or larger than the acceptable thermal load as a preconditioning start time.

* * * * *